(12) United States Patent
Pfeilschifter

(10) Patent No.: US 11,750,092 B2
(45) Date of Patent: Sep. 5, 2023

(54) CONFIGURABLE DC-TO-DC CONVERTER CIRCUIT AND VEHICLE ELECTRICAL SYSTEM

(71) Applicant: Vitesco Technologies GmbH, Regensburg (DE)

(72) Inventor: Franz Pfeilschifter, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 7 days.

(21) Appl. No.: 17/639,070

(22) PCT Filed: Sep. 17, 2020

(86) PCT No.: PCT/EP2020/075932
§ 371 (c)(1),
(2) Date: Feb. 28, 2022

(87) PCT Pub. No.: WO2021/053050
PCT Pub. Date: Mar. 25, 2021

(65) Prior Publication Data
US 2022/0311333 A1    Sep. 29, 2022

(30) Foreign Application Priority Data
Sep. 18, 2019    (DE) ...................... 10 2019 214 240.0

(51) Int. Cl.
*H02M 3/04* (2006.01)
*H02J 7/02* (2016.01)
*B60L 53/22* (2019.01)

(52) U.S. Cl.
CPC ................. *H02M 3/04* (2013.01); *H02J 7/02* (2013.01); *B60L 53/22* (2019.02); *B60L 2210/10* (2013.01)

(58) Field of Classification Search
CPC .......... H02M 3/04; H02M 7/217; H02M 1/32; H02M 3/22; H02M 7/219; H02M 3/33523;
(Continued)

(56) References Cited

U.S. PATENT DOCUMENTS

| 6,054,674 A | 4/2000 | Moriguchi et al. |
| 10,361,639 B1 | 7/2019 | Saso et al. |

(Continued)

FOREIGN PATENT DOCUMENTS

| DE | 102018217238 A1 | 4/2020 |
| WO | 2016105343 A1 | 6/2016 |
| WO | 2020001873 A1 | 1/2020 |

OTHER PUBLICATIONS

International Search Report and Written Opinion for International Application No. PCT/EP2020/075932, dated Dec. 11, 2020, with partial English translation, 13 pages.

(Continued)

*Primary Examiner* — Paul Dinh
(74) *Attorney, Agent, or Firm* — RatnerPrestia

(57) ABSTRACT

A configurable DC-DC converter circuit has first and second DC voltage connections. The first DC voltage connection connected to a plurality of galvanically isolating DC-DC converters via a configuration circuit that has first and second switches, between which a changeover switch connects the first and second switches to one another via a diode device and connects the first and second switches to one another via a resistor. The DC-DC converters connected to the first and second switches. In the first changeover switch position, the first and the second switch are closed in a first configuration position and connect the DC-DC converters in parallel with one another. If the changeover switch is in the first switching position, the first and second switches, in a second configuration position in which the first and the (Continued)

second switches are open, the DC-DC converters are connected in series with one another via the diode device.

11 Claims, 1 Drawing Sheet

(58) Field of Classification Search
CPC .......... H02M 7/2176; H02M 7/23; H02J 7/02; H02J 2207/20; H02J 7/04; H02J 7/345; H02J 2207/50; B60L 53/22; B60L 2210/10; B60L 2270/20; Y02T 10/70; Y02T 10/7072; Y02T 10/92; Y02T 90/14
USPC ........................................................ 320/109
See application file for complete search history.

(56) References Cited

U.S. PATENT DOCUMENTS

| | | |
|---|---|---|
| 2014/0112025 A1 | 4/2014 | Mueller et al. |
| 2020/0282848 A1* | 9/2020 | Suzuki .................... B60L 53/22 |
| 2021/0265855 A1 | 8/2021 | Pfeilschifter et al. |

OTHER PUBLICATIONS

International Search Report and Written Opinion for International Application No. PCT/EP2020/075932, dated Dec. 11, 2020, 19 pages (German).
German Examination Report for German Application No. 10 2019 214 240.0, dated Aug. 11, 2020, with English translation, 6 pages.

* cited by examiner

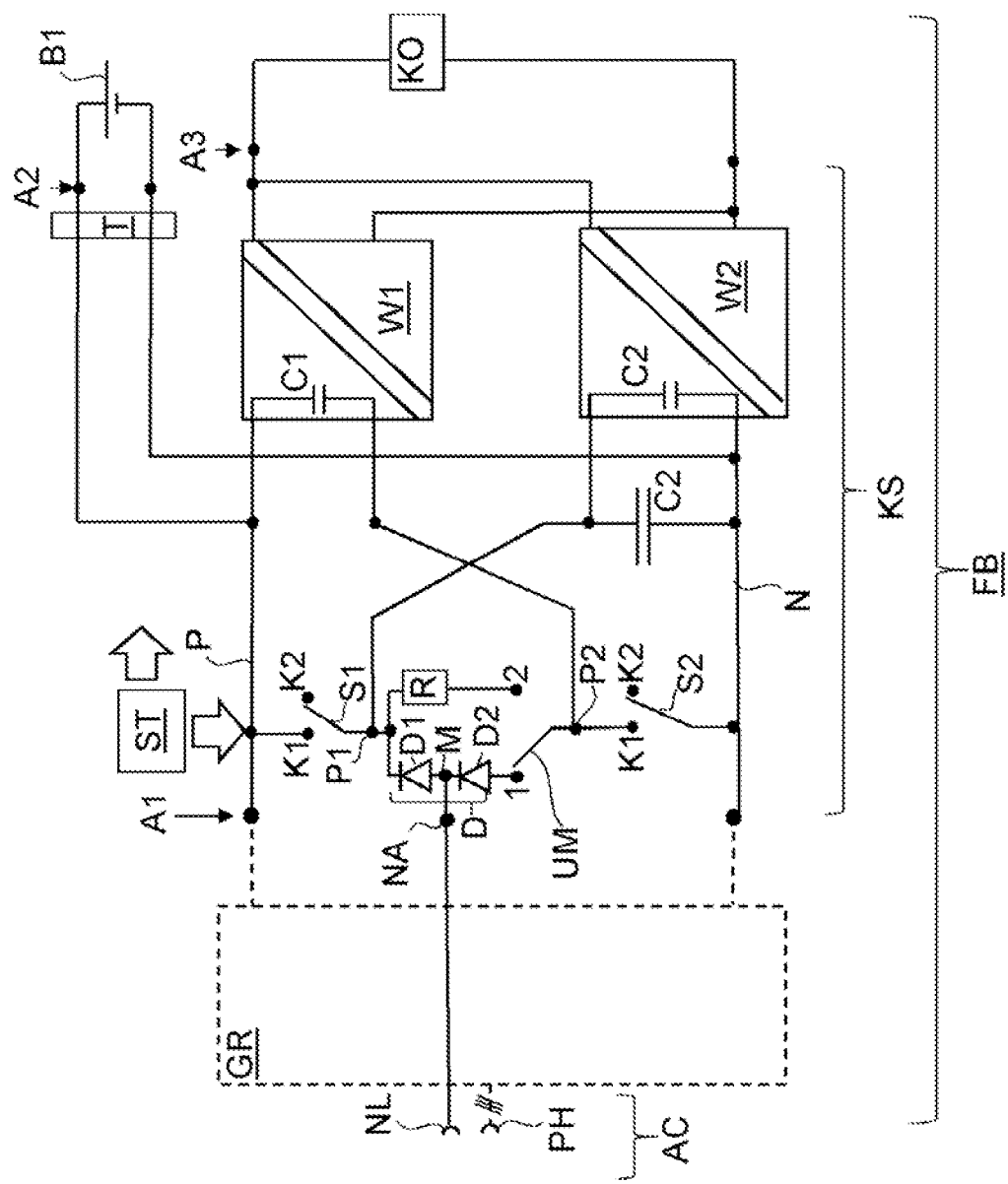

US 11,750,092 B2

CONFIGURABLE DC-TO-DC CONVERTER CIRCUIT AND VEHICLE ELECTRICAL SYSTEM

CROSS REFERENCE TO RELATED APPLICATIONS

This application is the U.S. National Phase Application of PCT International Application No. PCT/EP2020/075932, filed Sep. 17, 2020, which claims priority to German Patent Application No. 10 2019 214 240.0, filed Sep. 18, 2019, the contents of such applications being incorporated by reference herein.

FIELD OF THE INVENTION

The invention relates to a configurable DC-DC converter circuit for a vehicle electrical system.

BACKGROUND OF THE INVENTION

It is known practice for vehicles to be provided with an electrical storage unit having charging connections in order to charge the electrical storage unit by means of a charging station via the charging connections. Firstly, in the case of charging stations that provide AC voltage, it is necessary to convert the type of current, since the electrical storage unit is charged with rectified DC voltage. Secondly, the voltage level of the AC voltage is defined by the supply network and the number of phases of the AC network that are used, with the result that different voltage ranges are reached. Components in an on-board electrical system branch are supplied with power via voltage converters in order to allow these components, on the one hand, and the battery, on the other hand, to be able to be supplied with different voltages. It is also necessary, before the beginning and after the end of the charging process, for storage elements such as capacitors that are provided in the voltage converters to be precharged or to be discharged in order to avoid a current spike at the beginning of charging and contact voltages after the end of charging.

SUMMARY OF THE INVENTION

An aspect of the invention is to present a possibility that allows these functions to be realized in a simple manner.

Therefore, a configurable DC-DC converter circuit for a vehicle electrical system is provided, which DC-DC converter circuit allows single-phase and multi-phase AC charging through parallel/series configuration of converters, wherein a precharging/discharging function that allows the DC link capacitors of the DC-DC converters to be precharged is integrated in the configuration circuit. The converters are configured in parallel or in series on the input side by means of a configuration circuit. A configuration circuit that allows this series or parallel configuration in an adjustable manner is therefore connected upstream of the converter. In this configuration circuit, in addition to the switches in question, a resistor is also provided that can be connected within the configuration circuit via a changeover switch and allows precharging or discharging. The configuration switches that are used for parallel/series configuration (configuration for short) of the converters are also used to set whether the resistor is used for discharging or for precharging.

A configurable DC-DC converter circuit is therefore proposed that in particular is used in vehicle electrical systems.

The configurable DC-DC converter circuit has a first DC voltage connection and a second DC voltage connection. The first DC voltage connection corresponds to an input and is designed to be connected to a rectifier. The second DC voltage connection is used to connect the rechargeable battery, in particular the traction rechargeable battery of the vehicle electrical system. The second DC voltage connection is therefore designed to be connected to a rechargeable battery, in particular to a high-voltage rechargeable battery. The second DC voltage connection is therefore a rechargeable battery connection.

The first DC voltage connection is designed to be connected to a rectifier in order to be able to receive the rectified charging voltage therefrom. A configuration circuit is connected downstream of the first DC voltage connection. The first DC voltage connection is connected to a plurality of DC-DC converters, in particular to the input thereof, via the configuration circuit. The DC-DC converters are galvanically isolating. The converters and in particular the DC link capacitors thereof can be selectively connected in parallel or in series with one another by means of the configuration circuit. In this way, in the case of a high input voltage, for example, a series configuration of the converters can be provided, with the result that the DC link capacitors of said converters each receive only half of the total input voltage. To increase the capacitance, the converters are connected in parallel with one another when the input voltage at the first DC voltage connection is comparatively low.

The configuration circuit has a first and a second switch. A changeover switch is provided between these two switches. The changeover switch has two switching positions. In the first switching position, the changeover switch connects the first switch and the second switch via a diode device. In the second switching position, the changeover switch connects the first switch and the second switch via a resistor. The diode device is used to connect a neutral conductor potential, in particular in the case of single-phase charging, that is to say when a single-phase AC voltage is applied to an upstream rectifier. The resistor is used to limit the current when the capacitors of the DC-DC converters are discharged or precharged.

The DC-DC converters are connected to the first and to the second switch. The DC-DC converters are therefore connected to the configuration circuit, but in different ways. If the changeover switch is in the first switching position, the DC-DC converters are connected to the first and the second switch. In other words, in the first switching position, the changeover switch connects the DC-DC converters to the switches (the first and the second switch) of the configuration circuit. The connection between the converters and the switches is a crosswise connection. In this case, the first DC-DC converter is connected to the second switch of the configuration circuit and the second converter is connected to the first switch of the configuration circuit.

In the first switching position, the changeover switch connects the DC-DC converters in parallel with one another via the first and second switches in the closed state thereof. The changeover switch in the first switching position and the two switches in an open state connect the DC-DC converters in series with one another via the diode device. The closed position of the first and the second switch is also referred to as the first configuration position. The open position of the first and the second switch is referred to as the second configuration position. The changeover switch in the first switching position and the switches in the first configuration position connect the DC-DC converters in parallel with one another (in particular directly). The changeover switch in the first switching position and the switches in the second configuration position connect the DC-DC converters via the diode device, and therefore not directly.

The changeover switch has a central connection and two selectable contacts, one of which (depending on the switching position) is connected to the central connection. The selectable contacts can also be referred to as selectable connections. The first switch and the second switch can be designed as simple make contacts or break contacts. Each switch is respectively connected to one of the potentials of the first DC voltage connection. The first switch is connected to the changeover switch, in particular to a first one of the selectable contacts, via the diode device. The first switch is connected to the second one of the selectable contacts of the changeover switch via the resistor (that is to say that the first switch is connected to the changeover switch via the resistor). The second switch is connected to the central connection of the changeover switch. The first switch connects a first potential of the first DC voltage connection to a connecting point in a switchable manner. The diode device is connected to the resistor via the connecting point. The diode device connects the connecting point to the first selectable contact of the changeover switch. The resistor connects the connecting point (that is to say the first switch) to the second one of the selectable contacts of the changeover switch. The second switch connects the central connection of the changeover switch to the second potential of the DC voltage connection in a switchable manner.

The first switch connects the first potential of the first DC voltage connection to one of the two paths in a switchable manner, which paths can be selected by means of the changeover switch, and which (selectively) individually connect the first switch to the changeover switch and therefore to the second switch. The first path comprises the diode device and the second path comprises the resistor. As mentioned, that path via which the changeover switch connects the first switch in series with the second switch can be selected by means of the changeover switch. The DC-DC converters are connected to different sides of the paths. The second switch is connected to the first switch via the changeover switch and via the two paths running in parallel from the changeover switch to the first switch. The two paths are connected to one another by the connection thereof to the first switch. In particular, the voltage converters are connected to different switches (the first and the second switch). The changeover switch and the diode device and also the resistor are located between the connecting points between the DC-DC converters and the configuration circuit (apart from the connections between the converters and the potentials of the first DC voltage connection). In particular, the changeover switch and the two paths that comprise the diode device and the resistor, respectively, are provided between these points.

The diode device preferably comprises two diodes. Said diodes are connected to one another, in particular in series with one another, via a connecting point. The two diodes are connected to one another in the same direction. The forward direction of the first diode therefore corresponds to the forward direction of the second diode, wherein this relates to the end points of the diode device or to the ends of the series connection of the two diodes. The diodes of the diode device are reverse-biased with respect to the potentials of the DC voltage connection. In particular, the diodes of the diode device turn off in a direction that leads from the second switch to the first switch, or leads from the changeover switch to the first switch, provided that the first switch is connected to a positive supply potential of the DC voltage connection and the second switch is connected to a negative potential of the DC voltage connection.

The DC-DC converter circuit also has a neutral conductor connection. Said neutral conductor connection is designed to be connected to a neutral conductor of an AC voltage (that can be connected to a rectifier that can be connected upstream of the DC-DC converter circuit). The diode device comprises two diodes that are connected to one another via the connecting point, wherein the neutral conductor connection is connected to the connecting point. The neutral conductor connection is therefore connected to a point between the two diodes. In the case of multi-phase charging, this serves for dissipating asymmetrical currents.

The configurable DC-DC converter circuit can have an on-board electrical system branch connection. Said on-board electrical system branch connection is designed to be connected to components of an on-board electrical system branch. The on-board electrical system branch is connected to the DC-DC converters, in particular to that side of the DC-DC converters that is connected to the configuration circuit (and therefore to the first DC voltage connection). Those sides of the DC-DC converters that are averted from the first DC voltage connection are connected to one another, in particular in parallel form. This parallel connection is in turn connected to the on-board electrical system branch connection. Those sides of the DC-DC converters that are averted from the first DC voltage connection can also be connected in series with one another.

Provision can also be made for the DC-DC converters to each have DC link capacitors, in particular on those sides of the DC-DC converters that are facing the configuration circuit or the first DC voltage connection. The DC link capacitors are connected in parallel with the respective sides of the DC-DC converters or are connected, when connected in a parallel connection, to the connections of the respective converters that are connected to the configuration circuit. Those sides of the DC-DC converters that are facing the first DC voltage connection or the configuration circuit can also be referred to as input sides. The opposite sides of the converters can be referred to as output sides. The output sides are connected in parallel with one another and are also connected to the on-board electrical system branch connection. The input sides of the DC-DC converters are each provided with a parallel capacitor that acts as a DC link capacitor. The input sides of the DC-DC converters are connected to the configuration circuit.

The configurable DC-DC converter circuit can also have a controller. Said controller is connected to the changeover switch, the first switch and the second switch in an actuating manner. The controller comprises at least one of the following modes: a supply mode, in which the changeover switch is in the first switching position, and a precharging/discharging mode, in which the changeover switch is in the second switching position. In other words, the controller sets the changeover switch to the supply mode in such a way that it connects the two switches to one another via the diode device. In the precharging/discharging mode, the changeover switch connects the first switch to the second switch via the resistor. In the first switching position, the changeover switch therefore selects that path which connects the first switch to the second switch via the diode device. In the precharging/discharging mode, the changeover switch selects that path which connects the first switch to the second switch via the resistor. The path selected in the supply mode is routed via the diode device. The path selected in the supply mode is routed via the diode device.

As mentioned, when the changeover switch connects the first switch to the second switch via the resistor, it is possible to choose, by means of the switch position of the first and the second switch, whether the resistor is used for charging or for discharging. The precharging/discharging mode can therefore have a first submode in the form of a DC precharging mode. In this precharging mode, the respective DC link capacitor of the DC-DC converters is charged by means of the voltage (of the rechargeable battery) applied to the second DC voltage input. In the DC precharging mode, the controller is designed to close an isolating switch that connects the second DC voltage connection to the first DC voltage connection in a switchable manner. This isolating switch is connected upstream of the second DC voltage connection and is used to disconnect the second DC voltage connection in a switchable manner. Since the changeover switch connects the second switch to the first switch via the resistor, this results in a flow of current from the second DC voltage connection to the DC link capacitors via the closed isolating switch, wherein the magnitude of the flow of current is limited by the resistor. In the DC precharging mode, the DC link capacitors are charged by means of a DC voltage source.

Alternatively or in combination therewith, the controller can also be equipped for an AC precharging mode. In this case, the precharging/discharging mode comprises a second submode in the form of an AC precharging mode. In said mode, the controller controls an AC switch that is connected upstream of the first DC voltage connection or is provided between the first DC voltage connection and the configuration circuit or the DC voltage converters. In this way, a voltage obtained from rectification at the configuration circuit or at the converters is used for precharging, wherein the flow of precharge current is limited by the resistor. In order to actuate the AC precharging mode, the controller outputs an AC precharging signal that closes the switch (AC) in question that is connected upstream of the configuration circuit or the first DC voltage connection. The AC switch is not necessarily part of the DC-DC converter circuit, but rather can also be provided between the DC-DC converter circuit and an upstream rectifier, or else between an upstream rectifier and an AC voltage connection. The DC precharging mode can also be referred to as the DC voltage precharging mode. The AC precharging mode can also be referred to as the AC voltage precharging mode. The DC precharging mode and the AC precharging mode are mutually exclusive. In the AC precharging mode, the capacitors are charged with a rectified AC voltage.

As mentioned, a discharging mode can also be implemented with the circuit specified here, wherein the resistor serves as a current limiting element. The controller can be equipped for a first discharging mode, in the case of which the controller provides an isolating switch in an open state that isolates the second DC voltage connection from the first DC voltage connection in a switchable manner. In this mode, the controller is designed to open that isolating switch that is connected upstream of the second DC voltage connection and that connects the second DC voltage connection to the converters or the configuration circuit in a switchable manner. Alternatively or in combination therewith, the controller can be designed so as, in the first discharging mode, to provide in an open state, or to open, an AC switch that connects the first DC voltage connection to the configuration circuit or the converter, or that is connected upstream of the first DC voltage connection (either between the rectifier and the DC voltage connection or between the AC voltage connection and the rectifier). Preferably, in the first discharging mode, both the AC switch and the isolating switch are open, provided that they are present.

The discharging modes and the precharging modes are mutually exclusive. In the precharging mode or in the precharging modes, the changeover switch is in the second switching position, that is to say that the changeover switch in this case is in a position in which it connects the resistor to the second switch. In the precharging mode, the isolating switch between the second DC voltage connection and the converters or the configuration circuit is closed. At the end of the precharging mode, the changeover switch is put into switching position 1 (cf. The FIGURE). At the end of the precharging mode or the precharging modes, the controller puts the changeover switch into a position in which said changeover switch connects the second switch to the diode device. This can also take place before a charging phase begins. For discharging, the isolating switch and/or the AC switch (in each case if present) are opened. Preferably, the changeover switch is then put into the second switching position, that is to say that the changeover switch is then put into a switching position in which it connects the second switch to the resistor. The first and the second switch are closed for discharging. The first and the second switch are opened for precharging. In the precharging mode or the precharging modes, the first and the second switch are open. In the discharging mode or the discharging modes, the first switch is closed and the second switch is as well. The controller is designed to set these switching positions.

In the discharging mode or the discharging modes, the first and the second switch are closed only when the changeover switch is no longer in the first switching position (in which said changeover switch connects the second switch to the diode device), preferably only when the changeover switch connects the second switch to the resistor or the changeover switch is in the second switching position. The controller is designed to implement this sequence.

Furthermore, a vehicle electrical system is described that has a DC-DC converter circuit as described here. Furthermore, the vehicle electrical system has a rectifier and an AC connection. The AC connection is connected (directly or indirectly, for example via filters) to the first DC voltage connection via the rectifier. This is the first DC voltage connection that is part of the DC-DC converter circuit. The vehicle electrical system also has a rechargeable battery that is connected to the first DC voltage connection via an isolating switch (in particular one of the isolating switches mentioned above). The vehicle electrical system can also have an AC switch that is located between the AC connection and the rectifier and between the rectifier and the first DC voltage connection.

Furthermore, as mentioned, the AC switch can also be provided between the first DC voltage connection and the configuration circuit or the converters (in particular in a series connection). The rechargeable battery is preferably a high-voltage rechargeable battery and can be designed as a traction rechargeable battery. The rechargeable battery is in particular a lithium-ion rechargeable battery. The rechargeable battery preferably has a nominal voltage of at least 60 volts, in particular of at least 100 volts, 200 volts, 400 volts or 800 volts. In one embodiment, the rechargeable battery has a nominal voltage of at least 800 volts. The AC switch can also be implemented by the rectifier, which can be in the form of a controllable rectifier, wherein the function of an AC switch is implemented by virtue of the rectifier being switched to be inactive, and the function of a closed AC switch is implemented by an active or controlled rectifier. The rectifier can be in the form of a diode bridge circuit, in particular in the form of a diode full bridge, can in particular be configured to have multiple phases (with a number of phases preferably corresponding to the number of phases of the AC voltage connection), or can be in the form of a power factor correction filter such as a Vienna filter.

The vehicle electrical system can have at least one electrical component that is connected to that side of the DC-DC converters that is opposite that side of the converters to which the first DC voltage connection is connected. In other words, the at least one electrical component can be connected to that side of the DC-DC converters that is averted from the first DC voltage connection. The component can therefore be provided on the output side of the DC-DC converters. The at least one electrical component serves in particular as a placeholder for a vehicle electrical system branch that is supplied with power by the converters. The at least one electrical component can have an electrical drive. Said electrical drive is then supplied with power from the rechargeable battery via the DC-DC converters.

The vehicle electrical system can have a controller, in particular a controller as discussed above in the context of the description of the DC-DC converter circuit. The controller can be designed so as, in a first submode in the form of a DC precharging mode (in particular corresponding to the DC precharging mode mentioned above), in which the controller closes the isolating switch that connects the rechargeable battery to the first DC voltage connection in a switchable manner. In the first submode in the form of the DC precharging mode, the controller therefore actuates the isolating switch with a closed state. The precharging/discharging mode can have a second submode, in particular the second submode mentioned above. This submode is in the form of the AC precharging mode, in which the controller closes the AC isolating switch that is located between the first DC voltage connection and the AC voltage connection. In the precharging modes or in the precharging mode, the controller is therefore designed to actuate the isolating switch in such a way that it is closed. In this case, this is either the isolating switch between the second DC voltage connection and the converters or the configuration circuit, or an isolating switch that is connected upstream of the first DC voltage connection (or that is located between the first DC voltage connection and the configuration circuit).

BRIEF DESCRIPTION OF THE DRAWINGS

The FIGURE shows one embodiment of the configurable DC-DC converter circuit described in this case and of the vehicle electrical system described in this case.

DETAILED DESCRIPTION OF THE PREFERRED EMBODIMENTS

The vehicle electrical system FB comprises an AC voltage input AC that comprises phase contacts and a neutral conductor contact. The phase connections have three phases. A rectifier GR of the vehicle electrical system FB connects the AC voltage input AC to the configurable DC-DC converter circuit KS. Said DC-DC converter circuit has a neutral conductor connection NA for this purpose. Said neutral conductor connection is connected to the neutral conductor contact NL. The DC-DC converter circuit KS also has a first DC voltage connection A1 that comprises two (DC voltage) potentials P, N. The potential P is the positive supply potential. The potential N is the negative supply potential. A configuration circuit is connected in parallel with these potentials P, N, or with the first DC voltage connection A1.

The configuration circuit comprises a first switch S1, a second switch S2 and a changeover switch UM that is connected between these switches S1, S2. In addition to the changeover switch UM, firstly a diode device D and secondly a resistor R are connected between the changeover switch and the first switch S1. A connecting point P1 between the diode device D and the resistor R is provided to connect the first switch S1. This connecting point P1 is connected to the positive potential P of the first DC voltage connection A1 via the first switch S1. The changeover switch UM has a central connection P2 that is connected to the neutral conductor N via the second switch K2. The diode device D has two diodes D1, D2 that are connected to one another via a connecting point M of the diode device D. This connecting point M is connected to the neutral conductor connection NA of the DC-DC converter circuit KS.

The changeover switch UM has two switching positions 1 and 2. In the switching position 1, the changeover switch connects the second switch to the diode device D. In the second switching position 2 of the changeover switch UM, the changeover switch UM connects the second switch S2 to the resistor R. The resistor R is connected between the second switching position and the first switch or the connecting point P1. The diode device D is connected between the first switching position and the first switch S1 or the connecting point P1. In this case, the switching position corresponds to the contact that is connected. The diode device D comprises two individual diodes D1, D2 that are connected in series with one another, and the forward directions of which are the same direction. The diodes D1, D2 of the diode device are reverse-biased with respect to the positive potential P and the negative potential N.

The DC-DC converter circuit KS comprises two DC-DC converters W1, W2, the outputs of which are connected in parallel with one another. This relates to that side of the converters W1, W2 that is opposite the configuration circuit or the first DC voltage connection A1. The DC-DC converters W1, W2 are galvanically isolating DC-DC converters and in particular have a transformer (and also a primary-side chopper and a secondary-side rectifier). In particular, the rectifiers W1, W2 each comprise a DC link capacitor C1, C2 on that side that is connected to the first DC voltage connection or to the configuration circuit. A first (positive) connection of the first converter W1 is connected to the positive potential P. A second connection of the first converter W1 is connected to the connecting point P2 between the second switch S2 and the changeover switch UM. The second converter W1 has a first connection that is connected to the connecting point P1 or to the first switch S1. The first connection of the second converter W1 is therefore connected to the positive potential via the first switch S1. In contrast, the second connection of the first converter is connected to the negative potential via the second switch S2. The second converter W2 also comprises a second connection that is connected to the negative potential N. Therefore, the two converters W1, W2 are cross-connected to the converter circuit.

As mentioned, in addition to the first and the second switch S1, S2, the converter circuit comprises the changeover switch UM and the diode device D. To implement precharging or discharging, the configuration circuit also comprises a resistor R that, as mentioned, connects the first switch S1 to the changeover switch. The changeover switch UM can therefore set whether the second switch S2 is connected to the first switch via the diode device or via the resistor R. The resistor R can also be referred to as the discharge resistor or else as the precharge resistor.

A second DC voltage connection A2 is connected to the potentials P, N of the first DC voltage connection A1 via an isolating switch T. A third DC voltage connection A3 is used to connect at least one component KO of the vehicle electrical system FB. The third DC voltage connection A3 is connected to that side of the converters W1, W2 that is opposite the configuration circuit or the first DC voltage connection. The third voltage connection is connected to the parallel connection of the outputs of the converters W1, W2.

A controller ST is connected to the first and the second switch S1, S2, and to the changeover switch UM and the isolating switch T, in an actuating manner. The controller can also be connected to a switch in an actuating manner, which switch is located between the AC voltage connection AC and the rectifier GR, or is located between the rectifier and the first DC voltage connection A1, or is located between the DC voltage connection A1 and the configuration circuit.

If the converters are to be connected in parallel with one another, the changeover switch is therefore in position 1 and the first and the second switch S1, S2 are closed (that is to say in position K1). If the converters W1, W2 are to be connected in series, the switches S1, S2 are in position K2, that is to say in the open state. In this case, the converters W1, W2 are connected in series with one another via the diodes D1, D2 or the diode device D. The series connection is provided when three phases are actively connected to the AC voltage connection AC and the rectifier also operates all three phases. The parallel connection is provided when there is only single-phase charging, that is to say when there is only one phase at the AC voltage connection AC, or when the rectifier is in single-phase operation (and therefore has only activated one phase).

In a DC precharging mode, the isolating switch T is closed, with the result that the DC link capacitors C1 and C2 of the converters W1 and W2 can be charged via the second DC voltage connection A2 via the resistor R. In this case, the changeover switch UM is in position 2. The first and the second switch S1, S2 can be open in this case, with the result that half the voltage (based on the voltage at the second DC voltage connection A2) is present at each of the capacitors. The switches S1 and S2 can, however, also be closed in this case, with the result that the full voltage at the DC voltage connection A2 is also applied to each of the DC link capacitors C1, C2. An AC isolating switch is then in the open state, with the result that a precharge voltage can be introduced only via the second DC voltage connection and the isolating switch T thereof. In an AC precharging mode, the isolating switch T is open and an AC switch (where present) is closed, with the result that, from the AC voltage at the AC voltage input AC, a rectified voltage can be produced at the first DC voltage connection A2. A precharge current with which the capacitors C1 and C2 are charged is then provided via the resistor R by means of this voltage. In this case, the changeover switch is also in position 2. As mentioned, in this case the switches S1, S2 can be closed (position K1) or open (position K2), depending on whether the capacitors are intended to be connected in series or in parallel with one another for precharging.

The components depicted in dashes are only part of the vehicle electrical system and are not part of the DC-DC converter circuit. The connections A1, A2, A3 are used to connect the dashed components that are only part of the vehicle electrical system FB but not part of the DC-DC converter circuit KS.

The AC switch described above serves as an AC voltage isolating switch and can be referred to as such. Since numerous locations are possible for said switch (between AC and GR, between GR and A1 or between A1 and connection of the configuration circuit), for the sake of better clarity, the AC switch is not depicted at a particular position.

Furthermore, the controller can be designed to open the isolating switches in question when a target precharge voltage or a target discharge voltage is reached.

The invention claimed is:

1. A configurable DC-DC converter circuit comprising a first DC voltage connection and a second DC voltage connection, wherein the first DC voltage connection is connected to a plurality of galvanically isolating DC-DC converters via a configuration circuit, wherein the configuration circuit has a first and a second switch, between which a changeover switch is provided that, in a first switching position, connects the first switch and the second switch to one another via a diode device and, in a second switching position, connects the first switch and the second switch to one another via a resistor, wherein the DC-DC converters are connected to the first and the second switch and, if the changeover switch is in the first switching position, the first and the second switch are closed in a first configuration position and connect the DC-DC converters in parallel with one another and, if the changeover switch is in the first switching position, the first and the second switch, in a second configuration position in which the first and the second switch are open, the DC-DC converters are connected in series with one another via the diode device.

2. The configurable DC-DC converter circuit as claimed in claim 1, wherein the diode device has two diodes that are connected to one another via a connecting point, wherein the DC-DC converter circuit also has a neutral conductor connection that is connected to the connecting point.

3. The configurable DC-DC converter circuit as claimed in claim 1, which also has an on-board electrical system branch connection that is connected to the DC-DC converters on that side of the DC-DC converters that is averted from the configuration circuit.

4. The configurable DC-DC converter circuit as claimed in claim 1, wherein the DC-DC converters are each provided with DC link capacitors that are each connected in parallel with that side of the DC-DC converters that is connected to the configuration circuit.

5. The configurable DC-DC converter circuit as claimed in claim 1, which also comprises a controller that is connected to the changeover switch, the first switch and the second switch in an actuating manner, and that comprises at least one of the following modes:
 a supply mode, in which the changeover switch is in the first switching position, and
 a precharging/discharging mode, in which the changeover switch is in the second switching position.

6. The configurable DC-DC converter circuit as claimed in claim 5, wherein
 the precharging/discharging mode comprises a first submode in the form of a DC precharging mode, in which the controller closes an isolating switch that is connected to the controller in an actuating manner and that connects the second DC voltage connection to the first DC voltage connection in a switchable manner, and/or the precharging/discharging mode comprises a second submode in the form of an AC precharging mode, in which the controller outputs an AC precharging signal at an output of the controller, which AC precharging signal closes an AC switch that is connected to the controller in an actuating manner and that is connected upstream of the first DC voltage connection.

7. The configurable DC-DC converter circuit as claimed in claim 5, wherein the precharging/discharging mode comprises a first discharging mode, in which the controller opens an isolating switch that is connected to the controller in an actuating manner and that isolates the second DC voltage connection from the first DC voltage connection in a switchable manner, and/or the precharging/discharging mode comprises a first discharging mode, in which the controller outputs an AC discharging signal at an output of the controller, which AC discharging signal opens an AC switch that is connected to the controller in an actuating manner and that is connected upstream of the first DC voltage connection.

8. The configurable DC-DC converter circuit as claimed in claim 7, wherein the precharging/discharging mode comprises a second discharging mode, in which the controller which the first and the second switch are closed, wherein the controller is designed to set the second discharging mode after the first discharging mode.

9. A vehicle electrical system that comprises a configurable DC-DC converter circuit as claimed in claim 1, and that has a rectifier and an AC connection that is connected to the first DC voltage connection of the DC-DC converter circuit via the rectifier, and that has a rechargeable battery that is connected to the first DC voltage connection via an isolating switch.

10. The vehicle electrical system as claimed in claim 9, which has at least one electrical component that is connected to that side of the DC-DC converters that is opposite that side of the DC-DC converters to which the first DC voltage connection is connected.

11. The vehicle electrical system as claimed in claim 9, comprising a controller that is designed so as, in a first submode in the form of a DC precharging mode, to close the isolating switch that is connected to the controller in an actuating manner and that connects the rechargeable battery to the first DC voltage connection in a switchable manner, and/or the precharging/discharging mode comprises a second submode in the form of an AC precharging mode, in which the controller closes an AC isolating switch between the first DC voltage connection and the AC voltage connection.

* * * * *